(12) United States Patent
Kitamura et al.

(10) Patent No.: US 6,775,982 B1
(45) Date of Patent: Aug. 17, 2004

(54) SOLAR HEAT UTILIZATION STIRLING ENGINE POWER GENERATION PLANT

(75) Inventors: Kouzou Kitamura, Kyoto (JP); Kiyohiko Tsukumo, Kyoto (JP)

(73) Assignee: Taiyoukou Kenkyuujo Co., Ltd., Kyoto-fu (JP)

( * ) Notice: Subject to any disclaimer, the term of this patent is extended or adjusted under 35 U.S.C. 154(b) by 0 days.

(21) Appl. No.: 10/697,188

(22) Filed: Oct. 30, 2003

(30) Foreign Application Priority Data

May 12, 2003 (JP) ...................................... 2003-132509

(51) Int. Cl.$^7$ ............................................. B60K 16/00
(52) U.S. Cl. ................ 60/641.8; 60/641.11; 60/641.15
(58) Field of Search ........................... 60/641.8, 641.11, 60/641.15

(56) References Cited

U.S. PATENT DOCUMENTS 4,307,936 A * 12/1981 Ochiai ........................ 385/120
RE31,678 E * 9/1984 Ochiai ........................ 385/115
6,603,069 B1 * 8/2003 Muhs et al. ................. 136/246
6,653,551 B2 * 11/2003 Chen .......................... 136/246

FOREIGN PATENT DOCUMENTS

| JP | 2001-13357 | 1/2001 |
| JP | 2002-136271 | 5/2002 |

* cited by examiner

*Primary Examiner*—Hoang Nguyen
(74) *Attorney, Agent, or Firm*—Jordan and Hamburg LLP

(57) ABSTRACT

Objects of the invention is to make a fuel for generating power unnecessary, to generate no carbon dioxide ($CO_2$) by generating power without burning substance, and to make it possible to supply a hot water at the same time of generating power. A solar heat utilization stirling engine power generation plant is constituted by a Fresnel lens (1) for collecting a solar heat, a quartz glass light guiding fiber (3) for guiding a heat source collected by the Fresnel lens (1) and having a temperature between about 600° C. and about 2000° C. to a predetermined place, a stirling engine (4) driven by the heat source from the light guiding fiber (3), and a power generator (5) driven by the stirling engine (4).

3 Claims, 3 Drawing Sheets

SOLAR HEAT UTILIZATION STIRLING ENGINE POWER GENERATION PLANT

BACKGROUND OF THE INVENTION

1. Field of the Invention

The present invention relates to a solar heat utilization stirling engine power generation plant using light of the sun requiring no fuel.

2. Description of the Background Art

Various power generation plants have been conventionally provided, and there is generally a power generation plant of an internal combustion engine using a gasoline as a fuel. Further, there has been researched and developed a stirling engine which has no ignition noise and is silently operated as is different from the internal combustion engine.

In accordance with a basic principle of the stirling engine, a power generation is achieved by heating or cooling a working fluid (a working gas) sealed in a cylinder so as to generate a pressure fluctuation and vertically move a piston, thereby converting a vertical motion of the piston into a rotational motion.

In the case of heating the stirling engine mentioned above, a fuel is burned by a burner and a heat thereof is applied to a heating portion, however, in the case of burning the fuel such as the gasoline or the like, carbon dioxide ($CO_2$) is generated.

Accordingly, the light of the sun is considered as a thermal energy for supplying to the heating portion of the stirling engine. In this case, a lot of disc-like reflecting plates having one surface on which reflecting surfaces for reflecting the light of the sun are formed are arranged so as to form a bowl shape as an entire shape, and a stirling engine is arranged on a focal point of a lot of (for example, thirty two sheets of) reflecting plates (mirrors) arranged on a paraboloid thereof.

The reflected lights reflected by a lot of reflecting plates are focused, and the thermal energy thereof is supplied to the heating portion of the stirling engine, thereby heating the heating portion of the stirling engine.

However, in order to arrange a lot of reflecting plates and focus the reflected lights to one point, it is hard to place the reflecting plates, and the focusing cannot make satisfactory progress. Further, there have been problems that the entire apparatus is large-scaled, and an extremely high cost is required.

Further, since the light of the sun is temporarily reflected by the reflecting plates so as to be focused, there are problems that the heat collection is deteriorated, and a temperature cannot be increased any more since a temperature of the heating portion of the stirling engine is about 750° C. Accordingly, a power generator can generate only a low output of about 7.5 kW.

Further, in the case of intending to increase the temperature of the heating portion of the stirling engine, for example, up to 1000° C. in order to increase the output of the power generation of the stirling engine, it is necessary to further increase the number of the reflecting plates. Accordingly, a huge cost is required together with difficulty in placing the reflecting plates, and a running cost is increased, whereby the power generation plant full of demerits is provided.

In the meantime, the patent document (Japanese Unexamined Patent Publication No. 2001-13357) was filed by the applicant of the present invention, and discloses the structure in which the thermal energy of the light of the sun is taken in by using the lens. However, in this case, the patent document describes that a slag is burned by the light of the sun focused by a lens, and the power generation, for example, by a steam turbine is carried out by the thermal energy generated when the slag is burned.

However, when burning the slag, the carbon dioxide is generated in the same manner as mentioned above, and a global warming is caused, thereby acting counter to the recent trend intending to reduce the carbon dioxide ($CO_2$).

In particular, there are various stirling engine power generation plants utilizing the heat obtained by burning a fossil fuel as the heat source, however, it is an actual condition that burning the fossil fuel generates a great problem in view of a global environment pollution and a discharge of global warming gas.

The present invention is made by taking the problem mentioned above into consideration, and present invention provides a solar heat utilization stirling engine power generation plant provided with at least the following objects.

(1) To make a fuel for generating power unnecessary.

(2) To generate no carbon dioxide ($CO_2$) by generating power without burning substance.

(3) To make it possible to supply a hot water at the same time of generating power.

(4) To provide a power generation plant which is less expensive than the conventional power generation plant.

(5) To provide a power generation plant of an environment protection type by making the fuel mentioned above unnecessary and generating no carbon dioxide ($CO_2$).

SUMMARY OF THE INVENTION

In accordance with a first aspect of the present invention, there is provided a solar heat utilization stirling engine power generation plant comprising:

a Fresnel lens 1 for collecting a solar heat;

a quartz glass light guiding fiber 3 for guiding a heat source collected by the Fresnel lens 1 and having a temperature between about 600° C. and about 2000° C. to a predetermined place;

a stirling engine 4 driven by the heat source from the light guiding fiber 3; and a power generator 5 driven by the stirling engine 4.

In accordance with the structure mentioned above, since a fuel for generating the power by the power generator 5 is the light of the sun, no fuel is required, and no substance is burned as is different from the conventional one, so that no carbon dioxide ($CO_2$) is generated. Therefore, it is possible to provide an ideal environment protection type power generation plant. Further, since no cost is required for burning, a running cost is set very low, and it is possible to provide a power generation plant which is less expensive than the conventional power generation plant. Further, since the water cooled in a cooling portion 42 from a water supply pipe 44 becomes a high temperature water and is discharged from a drain pipe 45 during an operation of the stirling engine 4 of the present plant, it is possible to supply the hot water at the same time of generating power.

In accordance with a second aspect of the present invention, there is provided a solar heat utilization stirling engine power generation plant, further comprising a tracking apparatus 2 for tracking the solar heat.

Accordingly, it is possible to effectively and securely utilize the solar heat.

In accordance with a third aspect of the present invention, there is provided a solar heat utilization stirling engine power generation plant, wherein a light receiving portion 31 of the light guiding fiber 3 receiving the solar heat from the Fresnel lens 1 is formed in an approximately conical shape in which a diameter is made larger in accordance with going close to the Fresnel lens 1.

Accordingly, it is possible to change a focusing area on a light receiving surface 32 of the light receiving portion 31 of the light guiding fiber 3 by moving the light receiving portion 31 of the light guiding fiber 3 in the same direction as the focusing direction of the Fresnel lens 1, and it is possible to easily obtain a heat source having a desired temperature, for example, between about 600° C. to about 2000° C. Therefore, it is possible to correspond to the stirling engine 4 having various outputs, by moving the light guiding fiber 3 in correspondence to the output of the stirling engine 4.

DESCRIPTION OF THE PREFERRED EMBODIMENTS

A description will be in detail given below of an embodiment in accordance with the present invention with reference to the accompanying drawings. The present invention provides a power generation plant structured such that in order to solve a problem concerning a global environment pollution and a discharge of a global warming gas, a heat is applied to a stirling engine by utilizing a clean solar heat which is friendly for a global environment as a heat source, and a power generation is achieved by a power generator driven by an output of the stirling engine.

Figure 1:
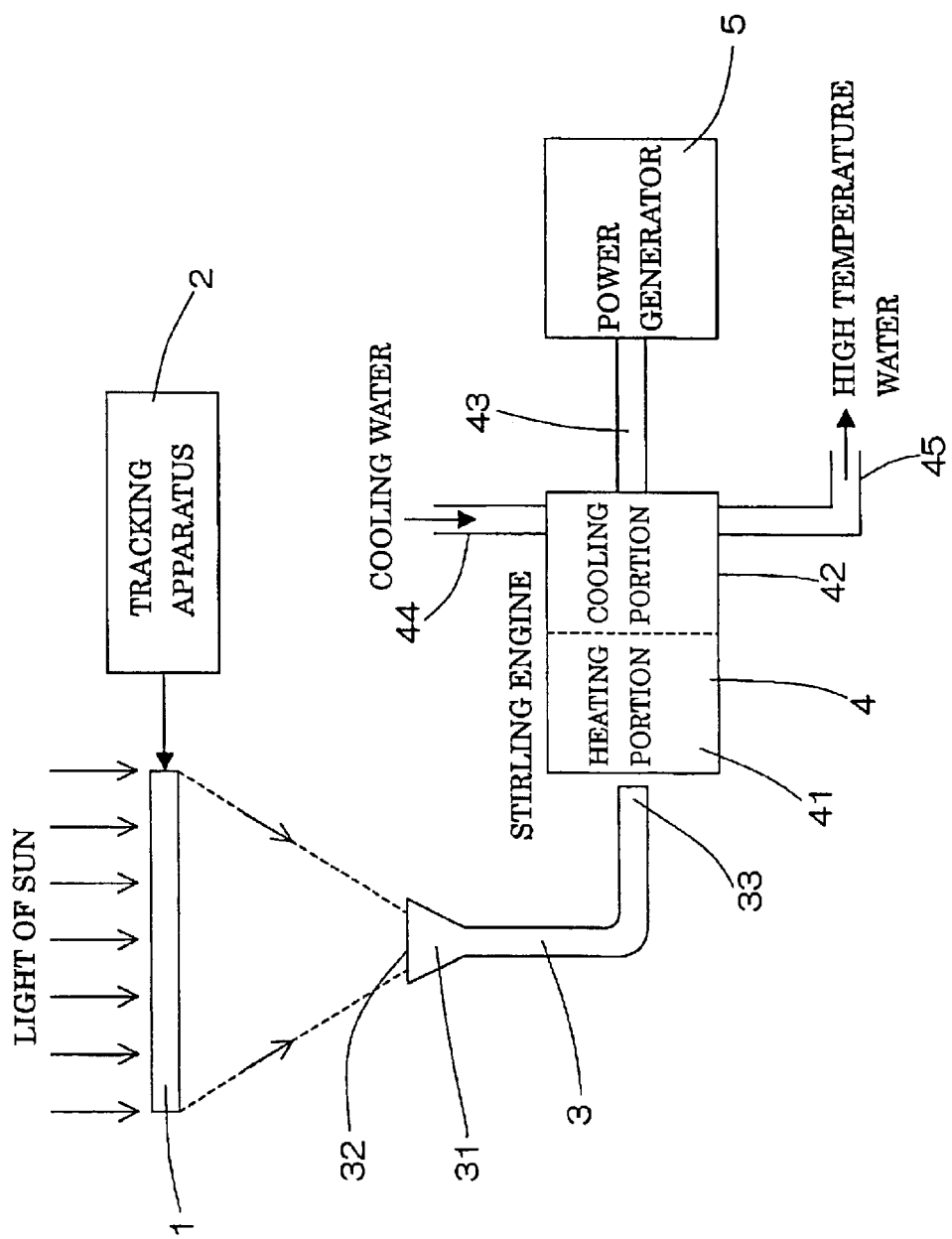
FIG. 1 is a block diagram of a system of a solar heat utilization stirling engine power generation plant in accordance with an embodiment of the present invention.

FIG. 1 shows a block diagram of a system in accordance with the present invention. The system is structured such that in order to utilize the heat source obtained by collecting the solar heat, the solar heat is collected by an acrylic Fresnel lens 1, and an optional temperature between 600° C. and 2000° C. is obtained along a focusing direction from a focusing portion of the Fresnel lens 1.

Further, reference numeral 3 denotes a quartz glass light guiding fiber. The heat source collected by the Fresnel lens 1 is securely and safely guided to a target place with no loss by the light guiding fiber 3.

The structure is made such that the stirling engine 4 is driven by the heat source generated by the Fresnel lens 1 and the light guiding fiber 3, and the power generator 5 is driven so as to generate power by an output of the stirling engine 4.

In this case, in order to effectively and securely collect the solar heat, a tracking apparatus 2 is provided, detects a change of a position of the sun in correspondence to a time of daytime by a sensor (not shown), and controls an azimuth angle and an elevation angle of the Fresnel lens 1 in correspondence to a change of the position of the sun. Accordingly, the solar heat is effectively and securely collected by steering the collecting surface of the Fresnel lens 1 toward the sun.

In this case, the tracking apparatus 2 integrally moves the light guiding fiber 3, the stirling engine 4 and the power generator 5 in addition to the Fresnel lens 1. Since the tracking apparatus 2 is provided, it is possible to effectively and securely utilize the solar heat.

Since the stirling engine 4 itself employed in the present invention is well known, a detailed description will be omitted. However, in accordance with a basic principle, a fixed amount of gas is charged within a closed container, and hydrogen, helium, air or the like is employed as the gas which is called as a working fluid.

As shown in FIG. 1, an inner portion of the stirling engine 4 is broadly divided into a heating portion 41 and a cooling portion 42, and the working fluid is alternately moved between the heating portion 41 (a high temperature side) and the cooling portion 42 (a low temperature side). Accordingly, it is possible to move a piston 43 and it is possible to take out a power. A vertical motion of the piston 43 in one end side is converted into a rotational motion in another end side, and the power generator 5 is driven by the rotational motion of the piston 43. Accordingly, the power generator 5 is driven and an electric output is obtained. In this case, although an illustration is omitted in FIG. 1, a regenerated heat exchanger is provided between the heating portion 41 of the stirling engine 4 and the cooling portion 42 so as to increase a thermal efficiency.

A water supply pipe 44 is connected to the cooling portion 42 of the stirling engine 4 in order to charge a cooling water for cooling the cooling portion 42 into the cooling portion 42, and a drain pipe 45 for discharging the cooling water after cooling the cooling portion 42 is connected to the cooling portion 42.

The cooling water flowing into the cooling portion 42 from the water supply pipe 44 becomes a high temperature water by cooling the cooling portion 42, and the high temperature water after cooling is discharged to an outer portion from the drain pipe 45.

Further, since a fixed amount of gas (for example, a helium gas) is sealed closely within the cylinder of the stirling engine 4, and the stirling engine 4 carries out a basic heat cycle repeating an isovolumetric heating, an isothermal expansion, an isovolumetric cooling and an isothermal contraction, the high temperature water can be obtained by heating the water supply in the heat exchanger. It is possible to variously utilize the high temperature water obtained by the stirling engine 4, within facilities or the like.

The Fresnel lens 1 employs a Fresnel lens having an optional diameter between about 1 meter (m) and about 20 meter (m). In the present embodiment, the Fresnel lens 1 having a diameter of about 20 m is employed. This is because the stirling engine 4 employs one having an output of about 55 kW, and the temperature of 1000° C. is required for heating the heating portion 41 of the stirling engine 4.

Further, the light receiving portion 31 of the approximately columnar light guiding fiber 3 for guiding the heat source collected by the Fresnel lens 1 is formed in an approximately conical shape, and a diameter of the light receiving portion 31 is enlarged in accordance with going close to a leading end. Further, the light receiving surface 32 in a leading end of the light receiving portion 31 is formed in a flat surface.

The heat source flowing from the light receiving surface 32 of the light guiding fiber 3 is introduced up to a discharging portion 33 via the Fresnel lens 1. The surface in the leading end of the discharging portion 33 is formed in an approximately flat surface, and the leading end surface of the discharging portion 33 is arranged so as to be in contact with or close to the heat supplying portion of the heating portion 41 in the stirling engine 4.

In this case, the shape of the light receiving portion 31 of the light guiding fiber 3 is formed in the approximately conical shape because of the following reason. In other words, the temperature of above 2000° C. can be obtained near the focal point of the Fresnel lens 1 having the diameter of about 20 m, and there is generated a case that an optional temperature between about 600° C. and about 2000° C. is required in correspondence to the output of the stirling engine 4.

Figure 2:
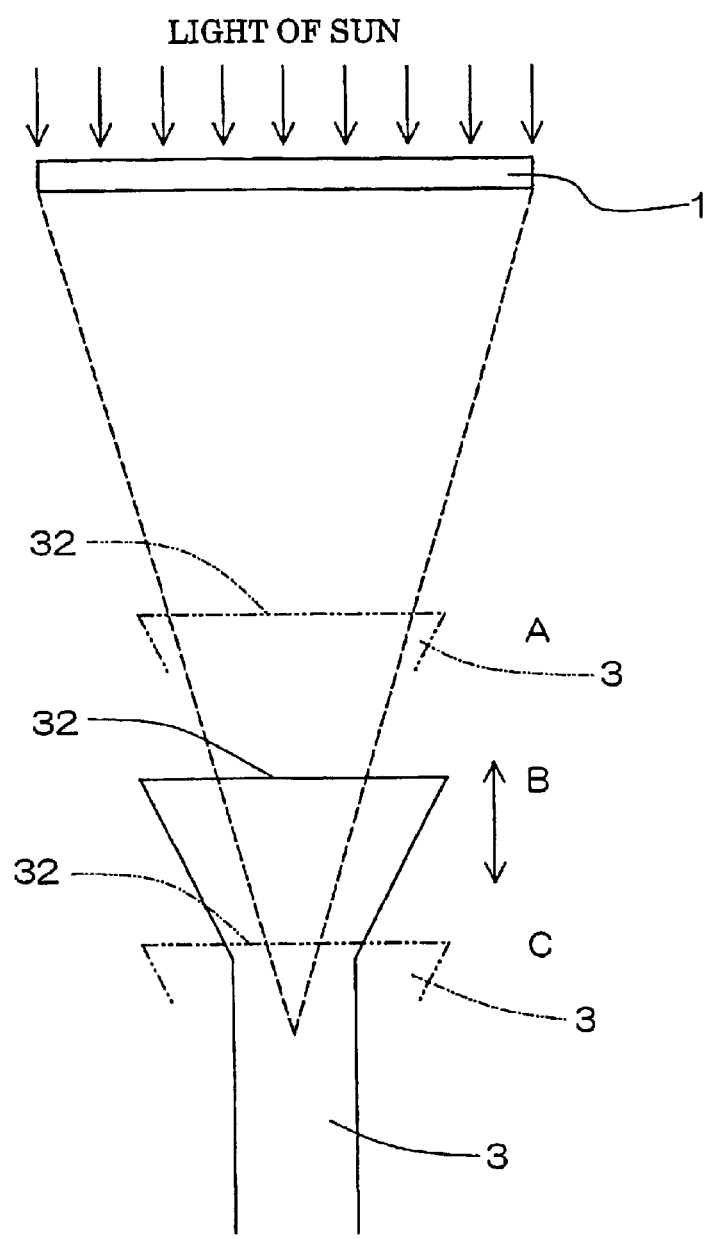
FIG. 2 is a schematic view of a focusing area on a light receiving surface of a light guiding fiber in accordance with the embodiment of the present invention.

Accordingly, as shown in FIG. 2, the structure is made such that the light guiding fiber 3 can move in the same direction as the focusing direction of the Fresnel lens 1, such that, for example, the focusing temperature is about 600° C. in the case that the position of the light receiving surface 32 of the light guiding fiber 3 is a position shown by reference symbol A in FIG. 2, the focusing temperature is about 1000° C. in the case that the position is a position shown by reference symbol B, and the focusing temperature is about 2000° C. in the case that the position is a position shown by reference symbol C. Therefore, it is possible to optionally set the focusing temperature of the light guiding fiber 3 in correspondence to the output of the stirling engine 4.

Figure 3:
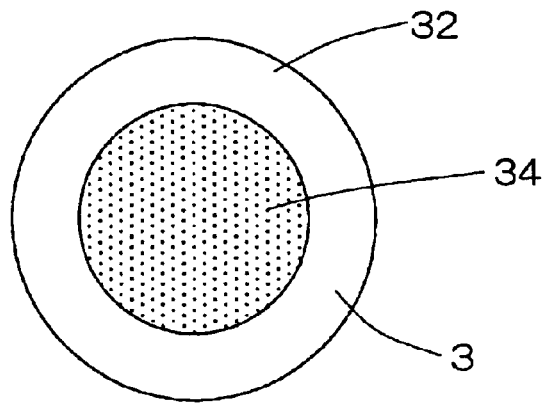
FIG. 3 is a schematic view of a focusing area on a light receiving surface of a light guiding fiber in accordance with the embodiment of the present invention.
Figure 3:
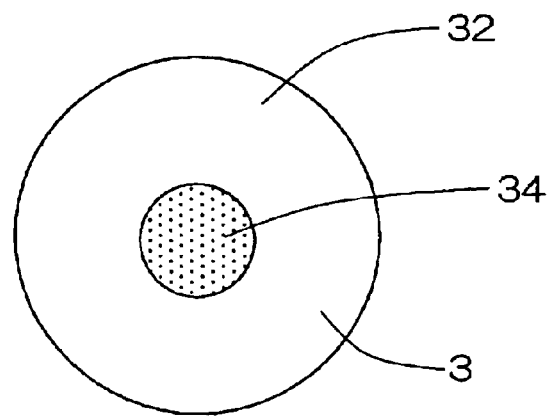
Figure 3:
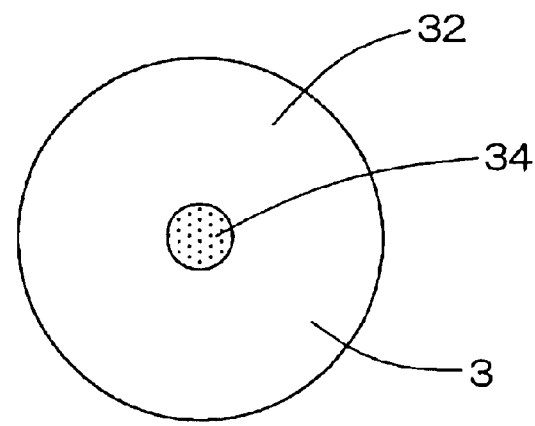

FIGS. 3A to 3C show focusing areas 34 in correspondence to the positions A, B and C in FIG. 2. The smaller the focusing area 34 is, the higher the focusing temperature is. Further, since the focusing area 34 becomes smaller with respect to the area of the light receiving surface 32 of the light guiding fiber 3 in accordance with the increase of the temperature, the collected heat source does not leak to a periphery of the light guiding fiber 3, so that a safety is improved.

Accordingly, the focusing area on the light receiving surface 32 of the light receiving portion 31 in the light guiding fiber 3 can be changed by moving the light receiving portion 31 of the light guiding fiber 3 in the same direction as the focusing direction of the Fresnel lens 1. It is possible to easily obtain the heat source having a desired temperature, for example, between about 600 and about 2000° C. Therefore, it is possible to correspond to the stirling engine 4 having various outputs, by moving the light guiding fiber 3 in correspondence to the output of the stirling engine 4.

Further, the heat source obtained by collecting the solar heat by means of the Fresnel lens 1 is supplied to the heating portion 41 of the stirling engine 4 via the light guiding fiber 3, the working fluid alternately moves between the heating portion 41 and the cooling portion 42 in the stirling engine 4 so as to drive the piston 43, thereby driving the power generator 5. The power generator 5 is driven, whereby a desired electric output is obtained.

In this case, since the light guiding fiber 3 employs the quartz glass as mentioned above, the loss of the collected heat is hardly generated, and the collected heat can be supplied to the heating portion 41 of the stirling engine 4.

Further, since the water cooled by the cooling portion from the water supply pipe 44 becomes the high temperature water so as to be discharged from the drain pipe 45 during the operation of the stirling engine 4 in the present plant, it is possible to supply the hot water at the same time of generating power.

Further, since the fuel for generating power by the power generator 5 is the light of the sun, no fuel is required. Further, since the substance is not burned as is different from the conventional one, no carbon dioxide ($CO_2$) is generated. Accordingly, it is possible to provide an ideal environment protection type power generation plant. Further, since the burning itself requires no cost at all, the running cost is very low, and it is possible to provide a power generation plant having a lower cost than the conventional power generation plant.

What is claimed is:

1. A solar heat utilization stirling engine power generation plant comprising:
   a Fresnel lens for collecting a solar heat;
   a quartz glass light guiding fiber for guiding a heat source collected by the Fresnel lens and having a temperature between about 600° C. and about 2000° C. to a predetermined place;
   a stirling engine driven by the heat source from the light guiding fiber; and
   a power generator driven by the stirling engine.

2. A solar heat utilization stirling engine power generation plant as claimed in claim 1, further comprising a tracking apparatus for tracking the solar heat.

3. A solar heat utilization stirling engine power generation plant as claimed in claim 1 or 2, wherein a light receiving portion of the light guiding fiber receiving the solar heat from said Fresnel lens is formed in an approximately conical shape in which a diameter is made larger in accordance with going close to the Fresnel lens.

* * * * *